United States Patent [19]

Strohbach

[11] Patent Number: 4,585,567
[45] Date of Patent: Apr. 29, 1986

[54] PURIFICATION OF FLUORINATED LUBRICANTS FREE FROM HYDROGEN

[75] Inventor: Hannelore Strohbach, Cologne, Fed. Rep. of Germany

[73] Assignee: Montefluos S.p.A., Milan, Italy

[21] Appl. No.: 712,119

[22] Filed: Mar. 15, 1985

Related U.S. Application Data

[63] Continuation of Ser. No. 541,253, Oct. 12, 1983, abandoned.

[30] Foreign Application Priority Data

Oct. 13, 1982 [DE] Fed. Rep. of Germany ....... 3237930

[51] Int. Cl.$^4$ .................... C10M 105/52; B01D 21/01
[52] U.S. Cl. ..................................... 252/58; 210/718; 210/729; 210/915; 210/730
[58] Field of Search .................. 252/58; 210/718, 729, 210/915, 730

[56] References Cited

U.S. PATENT DOCUMENTS 2,454,452 11/1948 Hodges ................................. 252/58
2,939,888 6/1960 Barnhart ........................... 252/58 X
4,324,665 4/1982 Yokomichi ....................... 252/58 X Primary Examiner—John F. Niebling

[57] ABSTRACT

There is proposed a process for the purification of fluorinated lubricants, free from hydrogen, such as perfluorinated ethers or chlorofluorocarbons, whose elimination can be dangerous for the environment owing to the fluorine release, such a process consisting in dissolving the lubricant in a fluorochlorinated hydrocarbon, then in precipitating by means of a grease solvent, in separating, in degasing and finally in filtering in order to remove the mechanical impurities.

9 Claims, 1 Drawing Figure

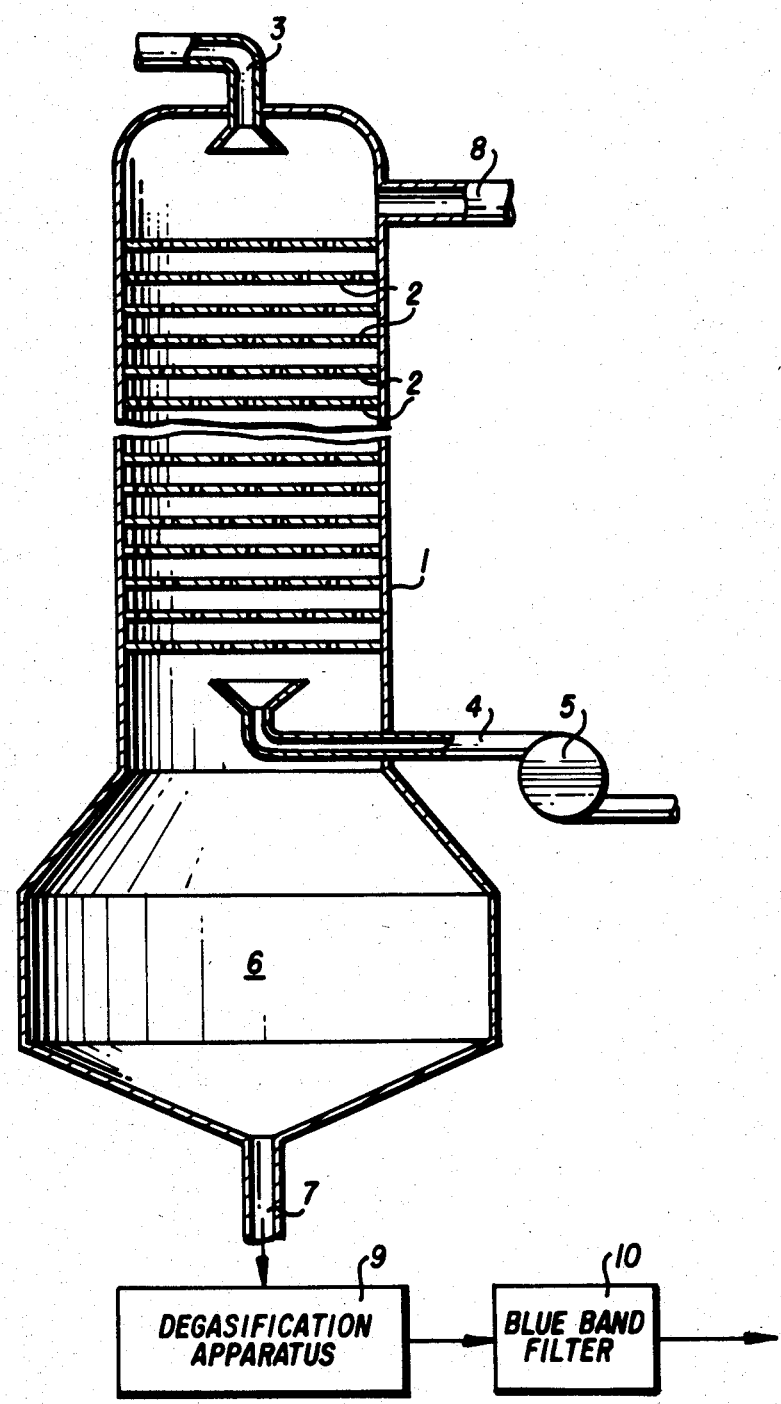

PURIFICATION OF FLUORINATED LUBRICANTS FREE FROM HYDROGEN

This is a continuation of application Ser. No. 541,253 filed Oct. 12, 1983 now abandoned.

THE PRESENT INVENTION

The invention relates to a process for the purification of fluorinated lubricants free from hydrogen, such as perfluorinated ethers, chlorofluorocarbons or the like.

Furthermore the present invention relates to an apparatus suitable to carry out this process.

In the chemical industry, in aeronautics, in astronautics and in the vacuum technique as well, it is known to use perfluorinated ethers of general formula:

or saturated chlorofluorocarbons free from hydrogen (polytrifluorochloroethylene) as lubricants.

In a mechanical vacuum pump, oily lubricants of this kind, besides acting as lubricants, still act as cooling agents and waterproofing agents. In diffusion pumps, oils of this kind serve as propellant. The employment of such oils in the vacuum technique is then required, when neither hydrogen nor hydrocarbons may be present. This is, for instance, the case, when gases rich in oxygen have to be pumped. By employing the usual mineral oils containing hydrocarbons, an explosion hazard could exist.

The mentioned fluorinated lubricants are commercially available with the trade name "Fomblin" (Trademark of Montedison S.P.A.) and "Halocarbon" (Trademark of Halocarbon Prod. Co.).

During the use of these lubricants in vacuum pumps, some impurities enter. On the one hand, these impurities are of mechanical nature (abrasion, dust or the like). On the other hand, these impurities consist of residual hydrocarbon, which may come for instance from a backing pump that works with mineral oils and is connected to the vacuum pump working with a lubricant free from hydrogen. Such vacuum backing pumps are, for instance, necessary for the working of diffusion vacuum pumps.

It was already proposed to purify perfluorinated ethers by heating, mixing with carbon powder and subsequently filtering.

However, with this method only the mechanical impurities are removed. The undesired hydrocarbon or mineral oil impurities remain in the lubricant, so that this latter is not suitable to be again employed in a vacuum pump that must pump in the absence of hydrogen.

Therefore, as usual always new lubricating oil free from hydrogen is fed into such vacuum pumps.

The working of such vacuum pumps is, therefore, very expensive, because the price per liter of such oils ranges from 1000 to 2000 German marks. Furthermore the problem arises of the elimination of the utilized oils. These oils can not be burnt out without particular precautionary measures, because the releasing fluorine pollutes the environment.

The main object of the present invention is to provide a process for the purification of fluorinated lubricants free from hydrogen, that renders possible the elimination of the mineral oil impurities.

According to the invention, this object is achieved firstly by dissolving the fluorinated lubricant into a fluorochlorohydrocarbon, then by adding a grease solvent, by separating the thereby precipitating fluorinated lubricant and by subjecting it to a degasification.

The fluorinated lubricant and the mineral oil impurities therein contained dissolve into the fluorochlorohydrocarbon. The fluorinated lubricant is not more soluble in the successively added grease solvent (gasoline, benzene, toluene, hexane or the like). Therefore it precipitates, while the mineral oil impurities remain in solution. The grease solvent may be separated in a simple way, since the known fluorinated lubricants have a high density (about 1.9.). The subsequent degasification step is necessary, to remove the residual solvent from the fluorinated lubricant.

The chlorofluorohydrocarbons, whose boiling point is about at 50° C. (for instance trichlorotrifluoroethane), are suitable as solvents. Therefore, on one hand most of the process steps may be carried out at about room temperature. On the other hand the complete removal of this solvent can be carried out in a simple way, since a relative low vacuum and/or a heating of the product to a little more than the boiling point of the solvent may be sufficient.

The additional removal of the mechanical impurities by filtration can take place before or after the removal of the mineral oil impurities.

It is preferable to carry out the filtration of the fluorinated lubricant in the final step, because thereby also the mechanical impurities are removed, which enter the lubricant during the previous process steps as well.

The process according to the invention leads to extreme purity of the lubricant. The residual hydrocarbons impurities are below 1 μg/ml and, therefore, far below the residue impurity of the starting product before its use, which according to the manufacturers specifications is indicated as 3 μg/ml. After filtration of the purified lubricant in a blue band filter the impurities consisting of inorganic solid substances are not more detectable.

A suitable apparatus to carry out the process according to the invention comprises a container provided with perforated bottoms, through which the lubricant to be purified flows from the top towards the bottom and the grease solvent flows from the bottom towards the top. In such an apparatus the fluorinated lubricant free from the mineral oil impurities can be drawn off from the lower end of the container.

Further advantages and details of the invention will be illustrated by means of an example of the process on laboratory scale and by means of an apparatus suitable to carry out the process on a greater scale.

On the laboratory scale the purification process according to the invention was carried out as follows: about 370 g of a perfluorinated ether (Fomblin) to be purified were loaded into a 1000 ml separating funnel and dissolved into about 250 ml of trichlorotrifluoroethane.

Then about 200 ml of benzene were added and by shaking a precipitation of the product to be purified was caused.

The product which accumulates beneath, owing to its higher density, was discharged into two further 250 ml separating funnels. It is opportune to repeat these process steps.

The thus obtained product was then every time discharged into a 1000 ml round-bottom flask and connected to a vacuum pump, in order to suck off the solvent (about 30 g) that still remains in the product. Finally a heating to 70° C. and a further degasification of about an hour in a vacuum shelf drier took place.

The final process step was a filtration of the product by means of a blue band filter. Without use of vacuum the product needs about a week to pass through such a filter.

The yield amounted to about 75%. Residual impurities of the hydrocarbon: 1 µg/ml. Mechanical impurities were no more detectable. The yield can improve by using greater amounts of product to be purified.

The accompanying drawing represents schematically an example of an apparatus suitable to carry out the process according to the invention. It comprises a substantially upright container (1), that is provided with perforated bottoms (2) (preferably perforated bottoms of high-quality steel).

The product to be purified, after having been previously dissolved into a chlorofluorinated hydrocarbon, was feed through the connection branch (3) placed on the upper zone.

The grease solvent is admitted under pulsation into the lower zone through inlet pipe (4). To obtain the pulsations, use is made of the schematically represented pulsator (5).

When the apparatus is working the product to be purified flows through the part of container 1 provided with perforated bottoms from the top towards the bottom and the grease solvent from the bottom towards the top. The thus purified product accumulates in the lower part of container 1 and precisely below feed pipe 4 (space 6) and can be drawn off through outlet 7. Outlet 8 for the grease solvent and the impurities therein dissolved is placed above perforated bottoms 2. From outlet 7 the product enters degasification apparatus 9, simply represented by a block, wherein a removal of the residual solvent is carried out under vacuum (at about 1 mbar). Finally an elimination of the mechanical impurities takes place. This preferably occurs in a blue band filter, that is also simply represented by block 10.

What I claim is:

1. A process for the purification of fluorinated lubricants free from hydrogen, from mineral oils, characterized in that the lubricant to be purified is dissolved in a chlorofluorinated hydrocarbon, a grease solvent selected from the group consisting of gasoline, benzene, toluene and hexane is added to the resulting solution, the purified lubricant thereby precipitated is separated and is subjected to gasification for removing the residual solvent.

2. A process according to claim 1 characterized in that a filtration is additionally carried out in order to eliminate the mechanical impurities.

3. A process according to claim 2 characterized in that the filtration for the removal of the mechanical impurities is subsequent to the process steps for the removal of the hydrocarbon impurities.

4. A process according to claim 1, in which the degasification of the product to be purified is carried out under vacuum.

5. A process according to claim 4, in which the product to be purified is heated, during the vacuum degasification, to a temperature higher than the boiling temperature of the solvent of the fluorinated lubricant.

6. A process according to claim 1, in which the fluorinated lubricant to be purified is a perfluorinated ether.

7. A process according to claim 1, in which the fluorinated lubricant to be purified is a chlorofluorocarbon.

8. A process according to claim 1, in which the solvent of the fluorinated lubricant is trichlorotrifluoroethane.

9. A process according to claim 1 characterized in that, trichlorotrifluoroethane is employed as chlorofluorocarbon.

* * * * *